(12) United States Patent
Keane

(10) Patent No.: US 6,231,071 B1
(45) Date of Patent: May 15, 2001

(54) SIDE CURTAIN AIR BAG MODULE

(75) Inventor: John V. Keane, Auurn Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/406,555

(22) Filed: Sep. 27, 1999

(51) Int. Cl.[7] .............................. B60R 21/20; B60R 21/22
(52) U.S. Cl. ........................................ 280/730.2; 280/751
(58) Field of Search .............................. 280/730.2, 730.1, 280/751, 728.2

(56) References Cited

U.S. PATENT DOCUMENTS

| 5,098,124 | 3/1992 | Breed et al. . | |
|---|---|---|---|
| 5,127,669 | 7/1992 | Suran et al. . | |
| 5,135,252 | 8/1992 | Suran et al. . | |
| 5,141,279 | 8/1992 | Weller . | |
| 5,145,207 | 9/1992 | Bederka et al. . | |
| 5,335,937 | 8/1994 | Uphues et al. . | |
| 5,660,426 | 8/1997 | Sugimori et al. . | |
| 5,709,407 | 1/1998 | Stephens et al. . | |
| 5,833,304 | * 11/1998 | Daniel et al. ......................... | 280/751 |
| 5,865,462 | 2/1999 | Robins et al. . | |
| 5,988,673 | * 11/1999 | Stavermann ........................ | 280/730.1 |
| 6,079,732 | * 6/2000 | Nakajima et al. ................. | 280/730.2 |

* cited by examiner

Primary Examiner—Peter C. English
(74) Attorney, Agent, or Firm—Larry Schurupoff

(57) ABSTRACT

A side air bag system including inflatable curtain, a deployment member for moving the curtain into an extended position and a carrier module. The carrier module includes a carrier structure and an energy-absorbing member. The curtain and deployment member are assembled to the carrier structure, which permits the side air bag system to be efficiently installed into a vehicle. The energy-absorbing member is coupled to one side of the carrier structure and absorbs energy from an impact between a vehicle occupant and the carrier structure.

15 Claims, 3 Drawing Sheets

SIDE CURTAIN AIR BAG MODULE

BACKGROUND OF THE INVENTION

1. Technical Field

The present invention relates generally to an inflatable restraint for a vehicle occupant. More particularly, the present invention relates to a side restraint for a vehicle occupant wherein the air bag carrier module includes an energy-absorbing counter measure.

2. Discussion

Side airbag protection systems are increasingly fitted as standard equipment on production vehicles in the U.S. and European markets. One trend in side airbag protection systems has been toward inflatable side curtains which deploy across the upper portion of the vehicle to prevent the vehicle occupants from impacting against one of the vehicle's side windows. Many of these side curtain systems similarly prevent broken glass from entering into the passenger compartment.

One significant drawback associated with the known side curtain systems concerns their packaging into the vehicle and their impact on the vehicle occupant, especially taller vehicle occupants. The side curtain systems are conventionally integrated into a vehicle along the roof line along the bottom of the headliner. When relatively tall vehicle occupants are subjected to a side impact, their heads may tend to contact the side of the vehicle proximate the bottom of the roof liner. Assuming that the side curtain deploys properly, the head of the vehicle occupant then contacts the vehicle body. As the carrier module is rigidly coupled to the vehicle body, vehicle occupants risk injury to their heads and necks when they participate in such collisions.

SUMMARY OF THE INVENTION

It is a general object of the present invention to provide an improved side airbag system.

It is a more specific object of the present invention to provide a side air bag system having an energy-absorbing carrier module.

An improved side air bag system is provided. The air bag system includes an inflatable curtain, a deployment member for moving the curtain into an extended position and a carrier module. The carrier module includes a carrier structure and an energy-absorbing member. The curtain and deployment member are assembled to the carrier structure, which permits the side air bag system to be efficiently installed into a vehicle. The energy-absorbing member is coupled to one side of the carrier structure and absorbs energy from an impact between a vehicle occupant and the carrier structure.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
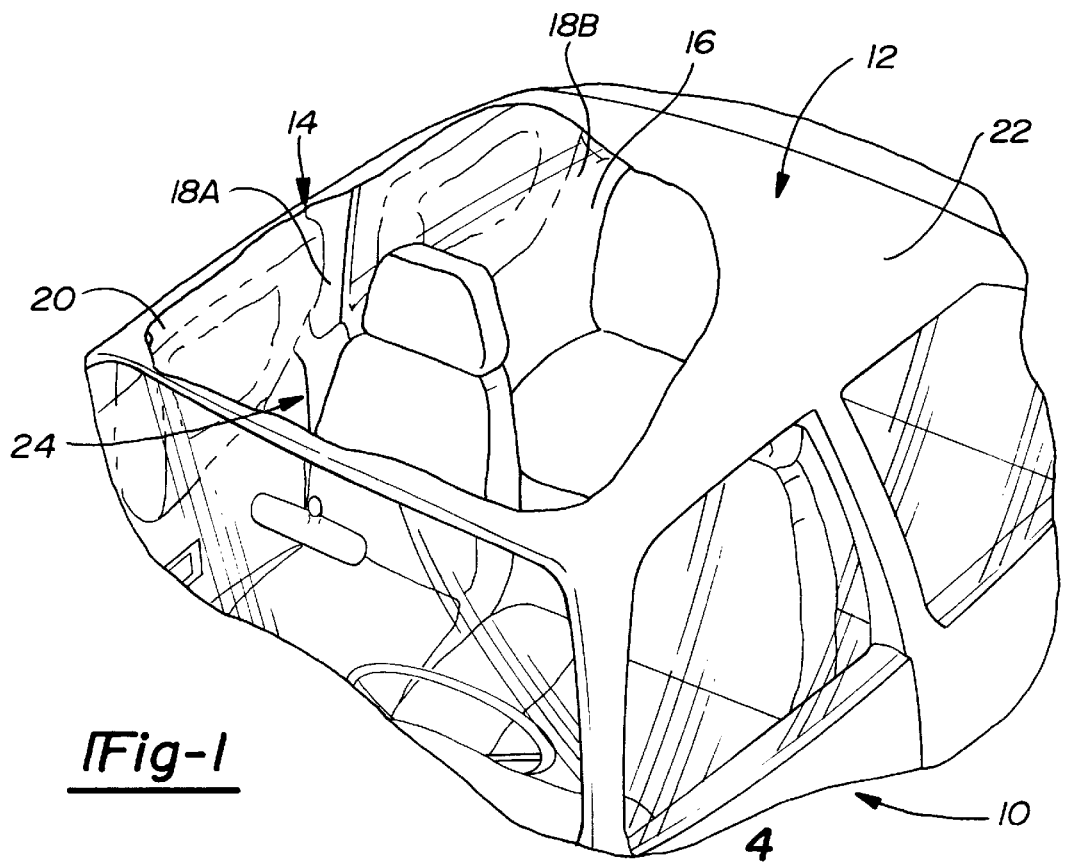
FIG. 1 is a perspective view of the interior of a vehicle having the air bag restraint system of the present invention.

With reference to FIG. 1 of the drawings, a vehicle incorporating the air bag restraint system of the present invention is generally indicated by reference numeral 10. Vehicle 10 includes a vehicle body 12, air bag restraint system 14 and a headliner 16. Vehicle body 12 includes first and second structural pillars 18A, 18B, a front door assembly 20 and a roof member 22, all of which are conventional in construction and needing no further discussion to enable the present invention. Headliner 16 is conventional in construction, providing a thermal and sound insulating barrier between roof member 22 and the passenger compartment 24, as well as at least partially covering air bag restraint system 14.

Figure 2:
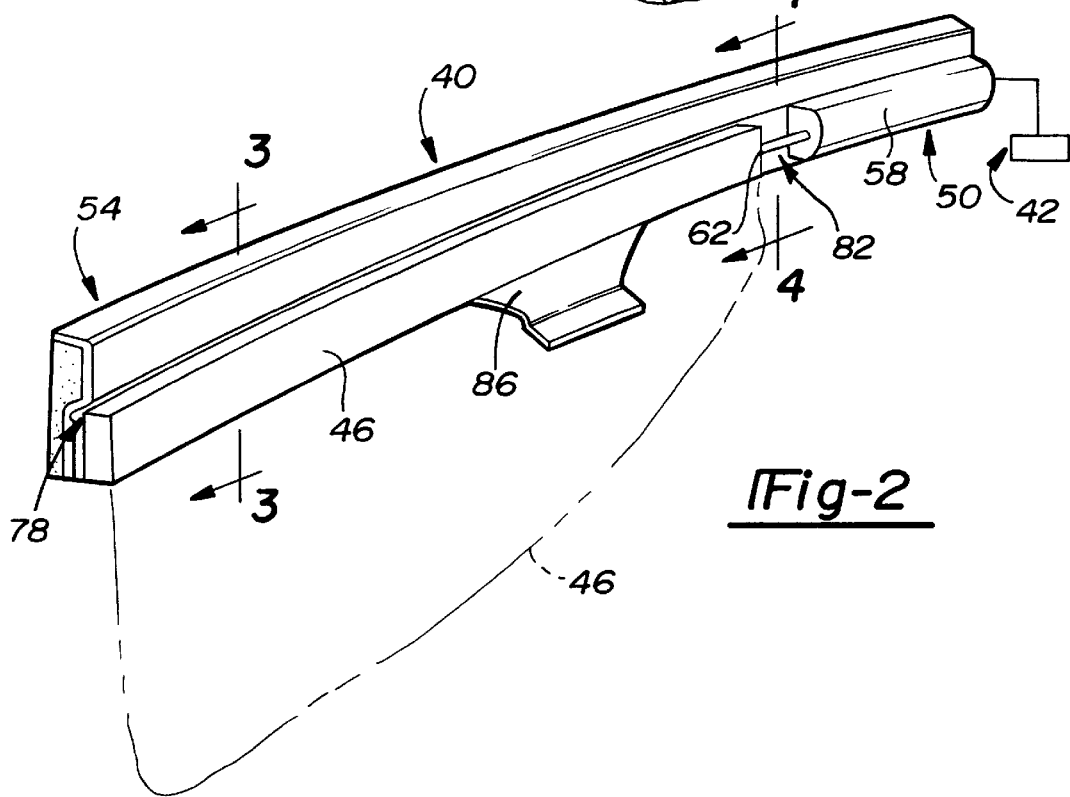
FIG. 2 is a perspective view of the air bag restraint system of the present invention.

In FIG. 2, air bag restraint system 14 is shown to include a restraint assembly 40 and a crash sensor 42. Restraint assembly 40 includes an inflatable curtain 46, a deployment member 50 and a carrier module 54. Inflatable curtain 46 is hollow with opposite triangular faces sealed around their edges to each other. The term "inflatable curtain" is intended to encompass any sheet-like member, at least part of which may be inflated. Inflatable curtain 46 is normally deflated and rolled up into a retracted position.

Deployment member 50 includes a gas generator 58 which is connected by a pipe 62 to inflatable curtain 46. On sensing an impact over a predetermined magnitude, crash sensor 42 actuates gas generator 58. Gas generator 58 includes an explosive substance which, on exploding, produces large volumes of gas very quickly. The gas produced by gas generator 58 inflates inflatable curtain 46 causing it to move into an extended position as shown in phantom line.

Figure 3:
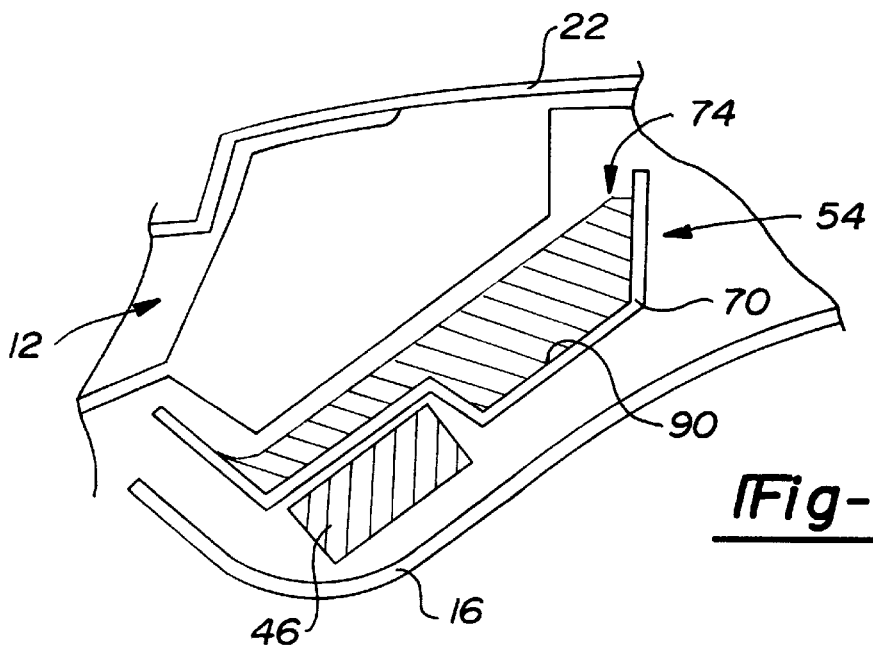
FIG. 3 is a cross-sectional view taken along the line 3—3 of FIG. 2.
Figure 4:
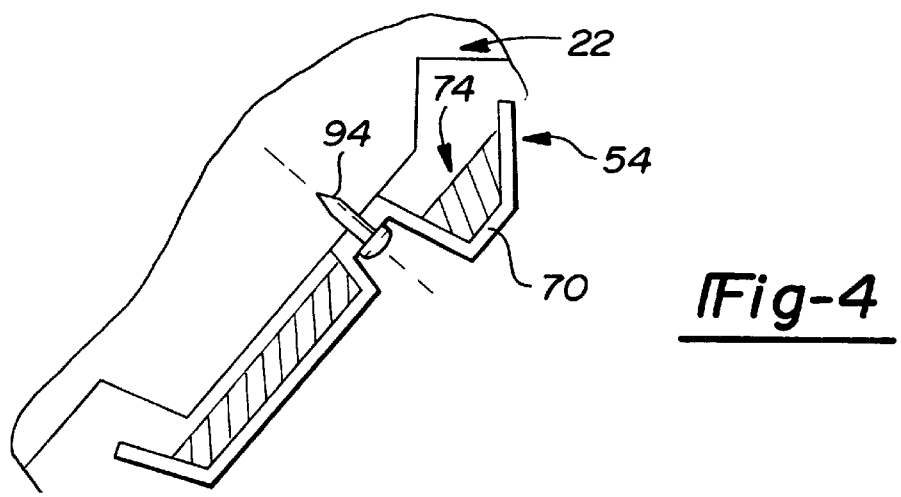
FIG. 4 is a partial cross-sectional view taken along the line 4—4 of FIG. 2.

With additional reference to FIGS. 3 and 4, carrier module 54 is shown to include a carrier structure 70 and an energy-absorbing means 74. Carrier structure 70 is a rigid but flexible fabrication, preferably formed through molding or extrusion from an appropriate material such as polypropylene. As shown, carrier structure 70 includes first and second portions 78, 82, respectively, wherein first portion 78 is sized to house inflatable curtain 46 and a second portion 82 is sized to house gas generator 58. Carrier structure 70 may also include one or more ramps 86, which are best shown in FIG. 2, for controlling the position of inflatable curtain 46 as it deploys. Inflatable curtain 46 and gas generator 58 are fixedly coupled to carrier structure 70. Construction in this manner permits restraint assembly 40 to be sub assembled to facilitate and expedite the integration of air bag restraint system 14 into vehicle 10.

Energy absorbing means 74 is shown fixedly coupled to the rear surface 90 of carrier structure 70. Energy absorbing means 74 may be formed from an impact absorbing foam material, such as an open-celled polyurethane foam having a typical density of from about two pounds per cubic foot to about four pounds per cubic foot which has been thermo-formed and fixedly coupled to the carrier structure 70.

Carrier module 54 is fixedly coupled to vehicle body 12 through a plurality of conventional fasteners 94 (shown in FIG. 4) which are spaced apart along the length of carrier structure 70. Carrier module 54 is oriented relative to vehicle body 12 such that energy absorbing means 74 contacts roof member 22.

In operation, if a vehicle occupant impacts carrier module 54, energy from the impact is directed into and absorbed by energy absorbing means 74, thereby reducing the potential for injury resulting from contact between the vehicle occupant and carrier air bag restraint assembly 40. Advantageously, the placement of energy absorbing means 74 on the rear surface of carrier module 54 does not effect the operation of inflatable curtain 46.

Figure 5:
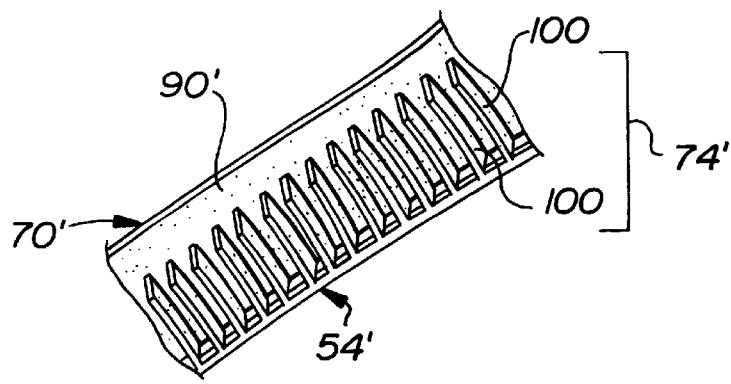
FIG. 5 is a perspective view of a portion of the carrier module of the present invention according to another preferred embodiment
Figure 6:
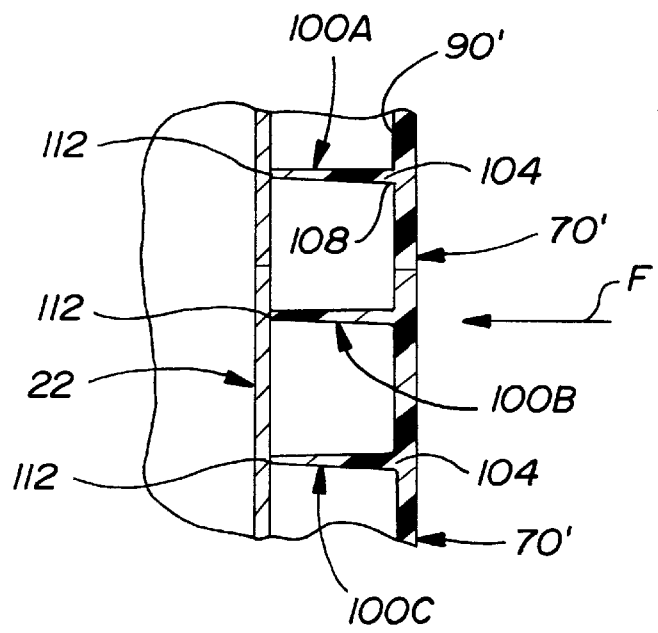
FIG. 6 is a cross-sectional view of the carrier module of FIG. 5.
Figure 7:
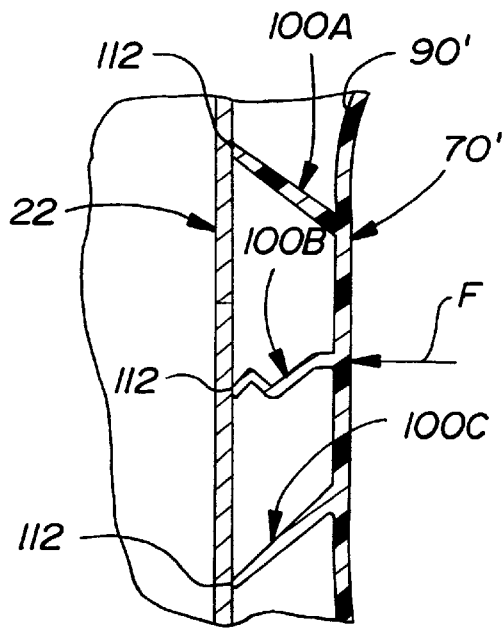
FIG. 7 is a cross-sectional view similar to that of FIG. 6 but showing the carrier module responding to an impact.

While the air bag restraint system of the present invention has been described thus far as having a foam energy absorbing means, those skilled in the art will appreciate that the invention, in its broader aspects, may be constructed somewhat differently. For example, the energy absorbing means is preferably formed from a plurality of flexible ribs similar to those constructed in commonly assigned U.S. Pat. No. 5,709,407 which is incorporated by reference as if fully set forth herein. Briefly, as shown in FIGS. 5 through 7, energy absorbing means 74' includes a plurality of elastomeric ribs 100 extending from the rear surface 90' of carrier structure 70'. Each of the plurality of ribs 100 includes an outboard free edge 112 which is positioned in matching juxtaposed relation to the corresponding portion of vehicle body 12. It will be observed that each rib 100 has a base edge 104 integrally molded to rear surface 90', along its full transverse length. The base edge 104 is seen extending from a radiused juncture 108 between rib 100 and rear surface 90'. The rib forward edge 112 is spaced a predetermined dimension from the rear surface 90' of carrier structure 70'.

Ribs 100 are adapted to cooperate with vehicle body 12 to provide an energy absorbing composite arrangement for absorbing a force thereon by an occupant striking carrier structure 70'. FIG. 7 shows an exemplary resultant force "F" impacting carrier module 54', causing carrier structure 70' to bow inwardly. Initially ribs 100 deform in an elastic manner, but if resultant force "F" is sufficiently high in magnitude, permanent deformation will occur, possibly resulting in the breaking of frangible rib 100B. Adjacent ribs 100A and 100C have similarly undergone deformation upon being deflected in opposite diverging directions. As with rib 100B, ribs 100A and 100C initially deform elastically and then permanently if resultant force "F" is sufficiently high.

While the invention has been described in the specification and illustrated in the drawings with reference to several preferred embodiments, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. An inflatable restraint for a vehicle occupant comprising:
    an inflatable curtain;
    a deployment device for moving the curtain into an extended position; and
    a carrier module including a carrier structure and means for absorbing energy, the carrier structure coupled to the inflatable curtain and deployment device, the carrier module housing the inflatable curtain and the deployment device, the energy-absorbing means coupled to the carrier structure and adapted for absorbing energy from an impact between the vehicle occupant and the carrier structure.

2. The inflatable restraint of claim 1, wherein the energy-absorbing means includes a plurality of ribs extending from a surface of the carrier structure, the plurality of ribs adapted to cooperate with a vehicle body to absorb forces, the energy absorption being provided by initial non-permanent deflection of at least one of the plurality of ribs, and thereafter by permanent deformation of the at least one of the plurality of ribs.

3. The inflatable restraint of claim 2, wherein each of said plurality of ribs has a forward free edge adapted to be positioned in juxtaposed matching conformity with an inner surface of the vehicle body.

4. The inflatable restraint of claim 1, wherein the energy-absorbing means includes an impact absorbing foam material.

5. The inflatable restraint of claim 4, wherein the impact absorbing foam material is an open-celled polyurethane foam having a density of from about two pounds per cubic foot to about four pounds per cubic foot.

6. The inflatable restraint of claim 4, wherein the impact absorbing foam material is thermo-formed and fixedly coupled to the carrier structure.

7. A vehicle comprising:
    a vehicle body; and
    an inflatable restraint installed in the vehicle body, the inflatable restraint including an inflatable curtain, a deployment device for moving the curtain into an extended position and a carrier module including a carrier structure and means for absorbing energy, the carrier module housing the inflatable curtain and the deployment device, the carrier structure coupled to the inflatable curtain and deployment device, the energy-absorbing means coupled to the carrier structure and adapted for absorbing energy from an impact between a vehicle occupant and the carrier structure.

8. The vehicle of claim 7, wherein the energy-absorbing means includes a plurality of ribs extending from a surface of the carrier structure, the plurality of ribs operable for cooperating with the vehicle body to absorb forces, the energy absorption being provided by initial non-permanent deflection of at least one of the plurality of ribs, and thereafter by permanent deformation of the at least one of the plurality of ribs.

9. The vehicle of claim 8, wherein each of said plurality of ribs has a forward free edge positioned in juxtaposed matching conformity with an inner surface of the vehicle body.

10. The vehicle of claim 7, wherein the energy-absorbing means includes an impact absorbing foam material.

11. The vehicle of claim 10, wherein the impact absorbing foam material is an open-celled polyurethane foam having a typical density of from about two pounds per cubic foot to about four pounds per cubic foot.

12. The vehicle of claim 10, wherein the impact absorbing foam material is thermo-formed and fixedly coupled to the carrier structure.

13. A vehicle comprising:

a vehicle body; and an inflatable restraint installed in the vehicle body, the inflatable restraint including an inflatable curtain, a deployment device for moving the curtain into an extended position and a unitarily formed carrier module having a carrier structure and a plurality of ribs, the carrier module housing the inflatable curtain and the deployment device, the carrier structure coupled to the inflatable curtain and deployment device, the plurality of ribs coupled to the carrier structure and adapted to cooperate with the vehicle body to absorb energy from an impact between a vehicle occupant and the carrier structure.

14. The vehicle of claim 13, wherein energy absorption is provided by initial non-permanent deflection of at least one of the plurality of ribs, and thereafter permanent deformation of the at least one of the plurality of ribs.

15. The vehicle of claim 13, wherein each of the plurality of ribs has a forward free edge that is adapted to be positioned in juxtaposed matching conformity with an inner surface of the vehicle body.

* * * * *